United States Patent
Hagedorn-Maillard et al.

(10) Patent No.: US 8,170,265 B2
(45) Date of Patent: May 1, 2012

(54) FRONT FACING ELECTRONIC SLAVE SPEAKER

(75) Inventors: Jurgen C. Hagedorn-Maillard, Guadalajara (MX); Enrique Chavez-Luna, Guadalajara (MX)

(73) Assignee: Continental Automotive Systems US, Inc., Auburn Hills ( * ) Notice: Subject to any disclaimer, the term of this patent is extended or adjusted under 35 U.S.C. 154(b) by 879 days.

(21) Appl. No.: 12/147,846

(22) Filed: Jun. 27, 2008

(65) Prior Publication Data
US 2009/0003642 A1    Jan. 1, 2009

Related U.S. Application Data

(60) Provisional application No. 60/937,413, filed on Jun. 27, 2007.

(51) Int. Cl.
*H04R 1/02* (2006.01)
*H04R 1/00* (2006.01)
*H04R 11/02* (2006.01)
*H04R 9/06* (2006.01)

(52) U.S. Cl. ............ 381/389; 381/386; 381/423

(58) Field of Classification Search ........... 381/386, 381/389, 423
See application file for complete search history.

(56) References Cited

U.S. PATENT DOCUMENTS

| | | | | |
|---|---|---|---|---|
| 4,267,993 A | * | 5/1981 | Shimizu et al. | 248/27.1 |
| 4,501,013 A | * | 2/1985 | Sato | 381/86 |
| 4,754,852 A | * | 7/1988 | Mule et al. | 181/149 |
| 4,896,373 A | * | 1/1990 | Blake | 455/344 |
| 5,757,945 A | * | 5/1998 | Sakamoto | 381/400 |
| 6,131,042 A | | 10/2000 | Lee et al. | |
| 6,154,201 A | * | 11/2000 | Levin et al. | 345/184 |
| 6,515,596 B2 | * | 2/2003 | Awada | 340/905 |
| 6,740,202 B2 | * | 5/2004 | Ishigaki et al. | 162/218 |
| 6,968,069 B1 | * | 11/2005 | Zhao | 381/345 |
| 7,177,438 B2 | * | 2/2007 | Iwaya et al. | 381/389 |
| 7,561,706 B2 | * | 7/2009 | Holmi et al. | 381/306 |
| 7,840,021 B2 | * | 11/2010 | Greco et al. | 381/334 |
| 7,916,890 B2 | * | 3/2011 | Irby et al. | 381/398 |
| 2001/0050194 A1 | * | 12/2001 | Ishihara et al. | 181/167 |
| 2003/0142835 A1 | | 7/2003 | Enya et al. | |
| 2004/0047476 A1 | * | 3/2004 | Sato | 381/89 |
| 2004/0109575 A1 | * | 6/2004 | Thigpen | 381/302 |
| 2005/0267674 A1 | * | 12/2005 | Suzuki et al. | 701/200 |
| 2007/0092097 A1 | | 4/2007 | Williams et al. | |
| 2007/0131478 A1 | * | 6/2007 | Okazaki et al. | 181/167 |
| 2007/0242834 A1 | * | 10/2007 | Coutinho et al. | 381/71.8 |
| 2008/0013780 A1 | * | 1/2008 | Kobayashi et al. | 381/398 |

(Continued)

FOREIGN PATENT DOCUMENTS

DE    1274191    8/1968
DE    19804264   10/1999

OTHER PUBLICATIONS

International Preliminary Report on Patentability mailed on Jan. 14, 2010.

(Continued)

*Primary Examiner* — Ida M Soward

(57) ABSTRACT

An example vehicle instrument panel includes a speaker for producing alert and warning sounds. A membrane prevents water from intruding into the speaker assembly and instrument panel. The membrane is spaced apart from the speaker and over an open end of the speaker housing. Sound energy from the speaker travels through an open space against the membrane. The membrane possesses acoustic properties to receive and pass on the sound energy.

15 Claims, 2 Drawing Sheets

U.S. PATENT DOCUMENTS

| | | | |
|---|---|---|---|
| 2008/0212800 A1* | 9/2008 | Kajihara et al. | 381/117 |
| 2009/0116682 A1* | 5/2009 | Suzuki et al. | 381/412 |
| 2010/0027826 A1* | 2/2010 | Mimura et al. | 381/337 |
| 2010/0040237 A1* | 2/2010 | Riggs | 381/2 |

OTHER PUBLICATIONS

International Search Report and Written Opinion mailed on Dec. 1, 2008.

* cited by examiner

FRONT FACING ELECTRONIC SLAVE SPEAKER

CROSS REFERENCE TO RELATED APPLICATION

The application claims priority to U.S. Provisional Application No. 60/937,413 which was filed on Jun. 27, 2007.

BACKGROUND OF THE INVENTION

This disclosure generally relates to a speaker assembly mounted within a vehicle instrument panel for generating warning and alert tones. More particularly, this disclosure relates to a speaker assembly that is substantially resistant to water and that is installed on the face of a vehicle instrument panel.

Instrument panels in motor vehicles are required to be substantially water proof to prevent potential damage caused by any number of events that could result in liquid penetrating to the electrical devices and connections within the instrument panel. Because of the requirement to be waterproof, speakers are not included on an exposed face of the instrument panel, but are instead mounted deep within the instrument panel and under the dashboard. Such a location presents several disadvantages. In some instances the location of the speaker will mute or muffle the warning and alert noises such that the operator may not hear them. To overcome this problem, a larger and more powerful speaker may be required, at a corresponding increase in cost and space utilized.

Accordingly, it is desirable to develop a speaker for use within a vehicle instrument panel that can be mounted in a location favorable for directing alert sounds to a vehicle operator.

SUMMARY OF THE INVENTION

An example speaker for a vehicle instrument panel includes a membrane for preventing water from intruding into the speaker assembly and instrument panel. The membrane is spaced apart from the speaker and over an open end of a speaker housing. Sound energy from the speaker travels through an open space against a back side of the membrane. The membrane possesses acoustic properties to receive and pass on the sound energy. Because the example speaker assembly is water proof, it can be directed outward on the visible and exposed face of the instrument panel. Because nothing is obstructing sounds emanating form the speaker assembly, the sound quality can be improved along with increasing volumes to aid in alerting and warning a vehicle operator.

These and other features of the present invention can be best understood from the following specification and drawings, the following of which is a brief description.

DETAILED DESCRIPTION OF THE PREFERRED EMBODIMENT

Figure 1:
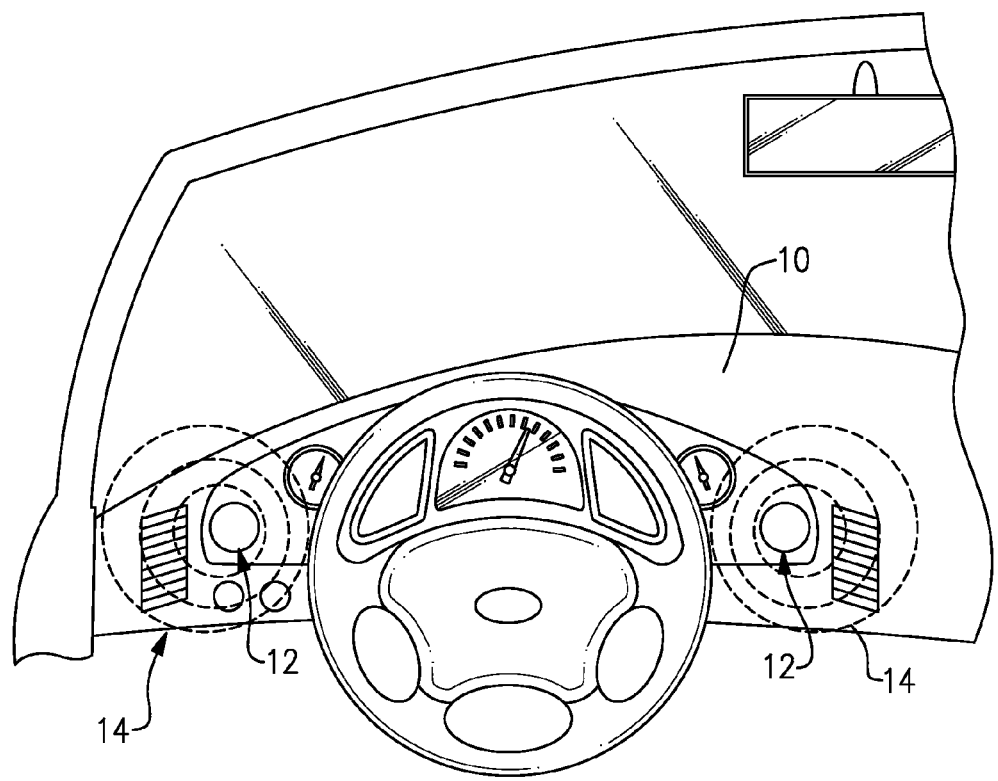
FIG. 1 is a front view of an example instrument panel.

Referring to FIG. 1, a vehicle dashboard 11 includes an instrument panel 10 with speaker assemblies 12. The speaker assemblies 12 emit sounds generated to alert a vehicle operator of specific vehicle conditions, such as for example a door open, keys left in the ignition or a warning when a fuel level goes low. The sounds generated are noises such as beeps, chimes or other tones familiar to a vehicle operator to warn and inform of current vehicle condition. The instrument panel 10 is required by vehicle manufacturers to be water proof. The example speaker assemblies 12 are pointed outward from the instrument panel 10 to improve the communication of sounds to an operator.

Figure 2:
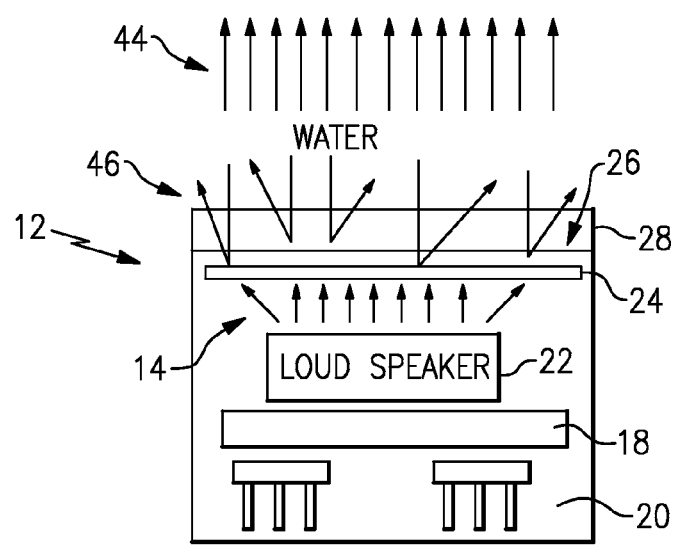
FIG. 2 is a schematic side view of an example speaker assembly.
Figure 3:
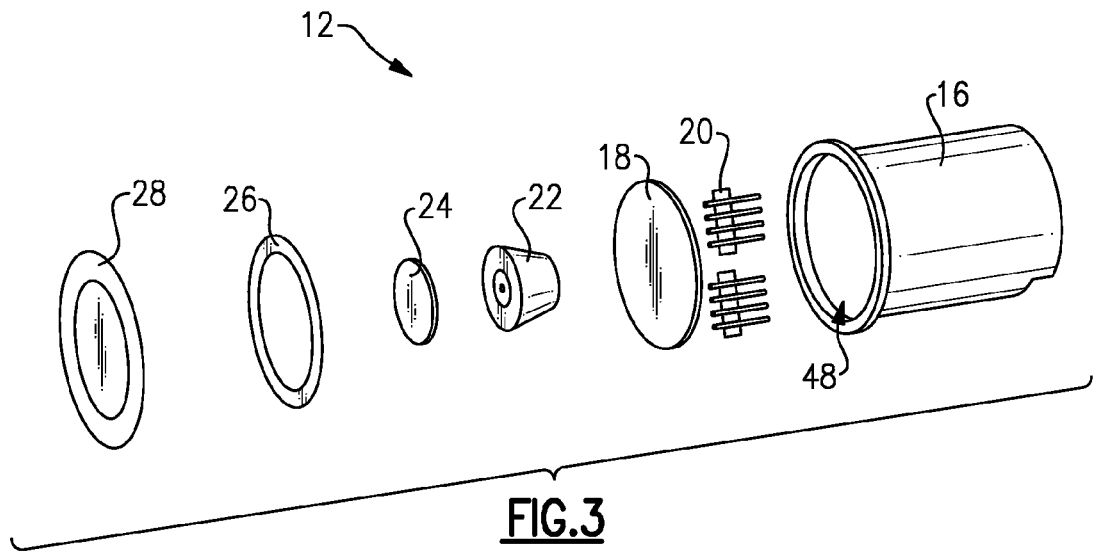
FIG. 3 is an exploded view of the example speaker assembly.

Referring to FIGS. 2 and 3, the example assembly 12 includes a speaker 22 mounted to a printed circuit board (PCP) 18. The speaker 22 and circuit board 18 are mounted within a housing 16. The example housing 16 is cylindrical and includes an open front end 48. The open front end 48 faces outward from the instrument panel 10 similar to how a dial gauge is positioned and visible in the instrument panel 10. Connectors 20 provide electrical communication between the PCP 18 and a circuit (FIG. 4) powering the speaker 24. The connectors 20 are as known in the art.

A membrane 24 extends over the open end 48 over the speaker 22. The membrane 24 is spaced apart from the speaker 22 such that an open space is provided between the speaker 22 and the membrane 24. The membrane 24 is held in place across the open end by a guide ring 26 and bezel 28. The bezel 28 may provide for securing the membrane 24 in place along with the guide 26 or may simply provide a desired cosmetic appearance providing a desired look to the instrument panel 10.

The membrane 24 is fabricated from a material that prevents water from penetrating through to the housing 16. The specific material can be any material that provides a water resistant or water proof function. The membrane 24 also includes desired acoustic properties such that it is reactive to sound energy. The membrane 24 receives sound energy generated by the speaker 24 and communicates and amplifies that sound energy to project the desired sounds outward from the panel 10 toward an occupant of the vehicle.

The membrane 24 provides the function of preventing water from entering the speaker assembly 12, while also performing the function of a speaker cone to further amplify and communicate sound energy from the instrument panel 10. Sound energy generated by the speaker 22 is communicated to a back side of the membrane 24. The membrane 24 vibrates in response to the sound energy from the speaker 24 and communicates that sound energy outward. The sound energy is amplified due to the larger area of the membrane as compared to the speaker 22.

Figure 4:
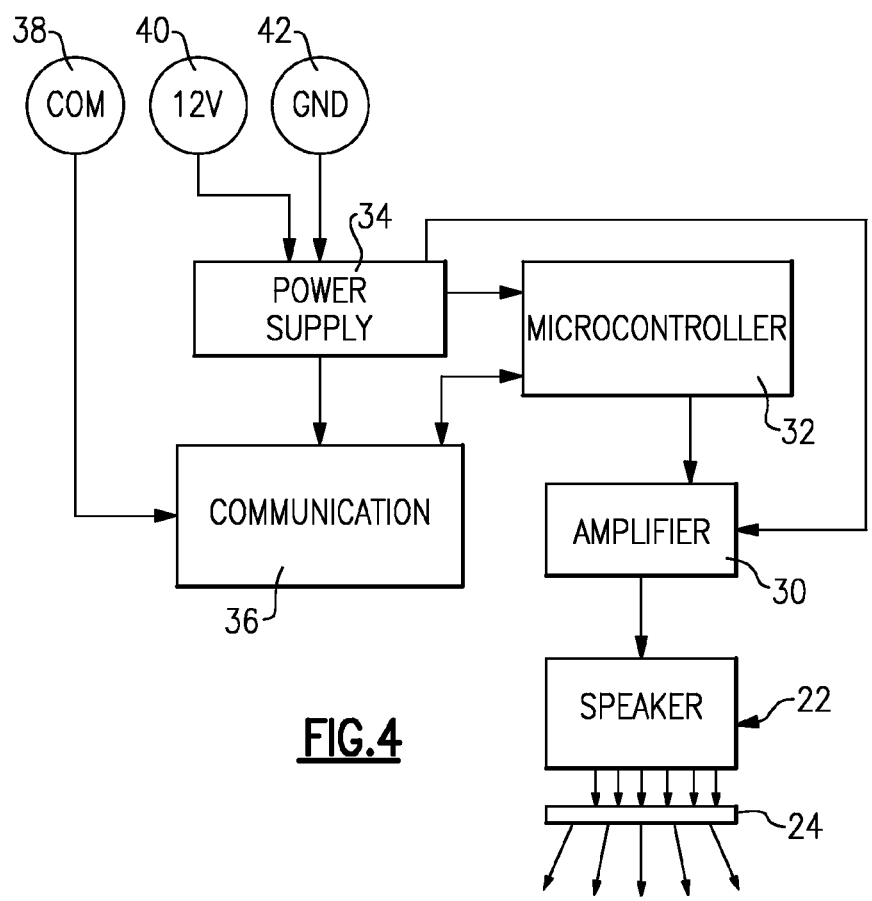
FIG. 4 is a block diagram of the example speaker assembly.

Referring to FIG. 4, the speaker assembly 22 includes an amplifier 30 powered by a power supply 34 and controlled by a microcontroller 32. The power supply includes a positive lead 40 and a ground 42 that is connected to a vehicle power supply. A communication link 38 provides signal indicative of vehicle conditions to a communication hub 36 and further from the communication hub 36 to the microcontroller 32. The microcontroller 32 actuates the amplifier to generate signals utilized by the speaker 30 to generate sound energy and specified frequencies and volumes to produce the desired tones.

The speaker 22 generates sound energy matched to the membrane 24 to produce the desired tone, chime or beep. The speaker 22 and membrane 24 act in concert within the housing 16 to produce the final audible tones. The housing 16, speaker 22 and membrane 24 all factor into the end sound produced by the speaker assembly 12.

Besides projecting sound energy from the speaker 22, the membrane 24 protects and prevents water intrusion. This feature provides for the speaker assembly 12 to meet water proofing requirements of the instrument panel 10. Because the example speaker assembly 12 is water proof, it can be directed outward on the visible and exposed face of the instrument panel. Additionally, it may be possible to utilize a smaller, less powerful speaker 22 as compared to prior art speakers that were required to be installed deep within the instrument panel and still provide an equal volume. Further, because nothing is obstructing sounds emanating form the speaker assembly, the sound quality can be improved along with increasing volumes to aid in alerting and warning a vehicle operator.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A speaker assembly for a vehicle instrument panel comprising:
   an instrument panel including a substantially vertical front facing surface;
   a housing including an open end, the housing within the instrument panel such that the open end faces outwardly from the vertical front facing surface of the instrument panel;
   a speaker mounted within the housing for producing sound energy; and
   a membrane resistant to water covering the open end of the housing for communicating sound energy from the speaker outward from the housing.

2. The speaker assembly as recited in claim 1, wherein the membrane comprises water proof material.

3. The speaker assembly as recited in claim 2, wherein the membrane amplifies sound energy generated by the speaker.

4. The speaker assembly as recited in claim 1, wherein the speaker is mounted to a printed circuit board disposed within the housing.

5. The speaker assembly as recited in claim 1, wherein the open end of the housing is directed outwardly from the vehicle instrument panel.

6. The speaker assembly as recited in claim 1, wherein the housing comprises a cylinder having a round open end and a bezel for installation in the vehicle instrument panel.

7. An instrument panel assembly comprising:
   an instrument panel defining a substantially front facing vertical surface;
   at least one gauge for displaying a vehicle operating parameter mounted within the instrument panel; and
   a speaker assembly mounted within the instrument panel and directed outward from the instrument panel parallel with the substantially vertical surface, the speaker assembly including a speaker for generating sound energy and a membrane covering the speaker and preventing water from contacting the speaker, the membrane communicating sound energy from the speaker outwardly from the instrument panel.

8. The instrument panel assembly as recited in claim 7, including a housing supported within the instrument panel and including an open end, wherein the speaker is disposed within the housing and the membrane is mounted over the open end.

9. The instrument panel assembly as recited in claim 8, including a printed circuit board to which the speaker is attached.

10. The instrument panel assembly as recited in claim 8, including an amplifier for generating signals received by the speaker for generating sound energy.

11. The instrument panel assembly as recited in claim 7, including a bezel mounted to the housing and the instrument panel.

12. A dashboard assembly comprising:
    a dashboard defining a top substantially horizontal surface;
    an instrument panel disposed below the dashboard and transverse to the top horizontal surface, the instrument panel including at least one gauge for providing a visual indication of a vehicle operating parameter; and
    a speaker assembly facing outwardly from the instrument panel in a direction common with the at least one gauge for generating noises to alert a vehicle operator of a vehicle condition, wherein the speaker includes a membrane covering the open end of the speaker for preventing moisture from contacting the speaker assembly.

13. The assembly as recited in claim 12, wherein the speaker assembly comprises a housing defining an open end, where the open end faces outward from the instrument panel toward a vehicle operator.

14. The assembly as recited in claim 12, wherein the speaker assembly comprises a speaker supported within the housing and spaced apart from the membrane, wherein the speaker generates noise energy received and amplified by the membrane.

15. The assembly as recited in claim 12, wherein the speaker assembly is visibly mounted within the instrument panel.

\* \* \* \* \*